(12) United States Patent
Namekata et al.

(10) Patent No.: US 9,015,901 B2
(45) Date of Patent: Apr. 28, 2015

(54) PORTABLE AIR BLOWER

(75) Inventors: Shigeki Namekata, Togane (JP);
Junichi Miyamoto, Togane (JP)

(73) Assignee: Maruyama Mfg. Co., Inc., Tokyo (JP)

( * ) Notice: Subject to any disclaimer, the term of this patent is extended or adjusted under 35 U.S.C. 154(b) by 446 days.

(21) Appl. No.: 13/594,039

(22) Filed: Aug. 24, 2012

(65) Prior Publication Data

US 2013/0047371 A1 Feb. 28, 2013

(30) Foreign Application Priority Data

Aug. 25, 2011 (JP) ................. P2011-184025

(51) Int. Cl.
*A47L 5/24* (2006.01)
*E01H 1/08* (2006.01)
*A01G 1/12* (2006.01)

(52) U.S. Cl.
CPC .............. *E01H 1/0809* (2013.01); *A01G 1/125* (2013.01)

(58) Field of Classification Search
USPC ........... 15/344, 345, 354, 411, 412, 413, 414, 15/415.1, 416, 418, 419
See application file for complete search history.

(56) References Cited

U.S. PATENT DOCUMENTS

| | | | | |
|---|---|---|---|---|
| 6,158,082 A | * | 12/2000 | Beckey et al. | 15/326 |
| 2002/0108211 A1 | * | 8/2002 | Svoboda | 15/405 |
| 2007/0256271 A1 | * | 11/2007 | Rhea | 15/328 |

FOREIGN PATENT DOCUMENTS

| | | |
|---|---|---|
| JP | 62-153600 A | 8/1987 |
| JP | 63-056720 U | 4/1988 |
| JP | 10-205496 A | 4/1998 |

OTHER PUBLICATIONS

Notice of Decision to Grant a Patent in corresponding Japanese Application No. 2011-184025 dated Oct. 29, 2013 (3 pages).
IPDL (Industrial Property Digital Library) Patent Abstract of Japan, Publication No. JP10-205496 dated Apr. 8, 1998 (1 page).
IPDL (Industrial Property Digital Library) Patent Abstract of Japan, Publication No. JP62-153600 dated Aug. 7, 1987 (1 page).

* cited by examiner

*Primary Examiner* — Robert Scruggs
(74) *Attorney, Agent, or Firm* — Osha Liang LLP

(57) ABSTRACT

A portable air blower includes: a first pipe having a first outlet opening communicating with a main body, the first pipe discharging wind generated in the main body through the first outlet opening; and a second pipe having a larger diameter than that of the first pipe, the second pipe being attached movably in the axial direction to the outer circumference of the first pipe and having a second outlet opening having a larger diameter than that of the first outlet opening. In the portable air blower, the second pipe is moved relative to the first pipe to dispose the second outlet opening upstream or downstream of the first outlet opening; the second pipe has an inflow window disposed upstream of the first outlet opening, the inflow window enabling air to flow from the outside into the second pipe.

4 Claims, 10 Drawing Sheets

PORTABLE AIR BLOWER

CROSS-REFERENCE TO RELATED APPLICATIONS

The disclosure of Japanese Patent Application No. JP2011-184025 filed on Aug. 25, 2011 including the specification, drawings and abstract is incorporated herein by reference in its entirety.

BACKGROUND OF THE INVENTION

1. Field of the Invention

The present invention relates to a portable air blower.

2. Related Background Art

Portable air blowers are well known that send wind by driving, for example, motors. For example, an air blower described in Japanese Unexamined Utility Model Registration Application Publication No. 63-56720 includes an air blow pipe joined to a main body including, for example, a motor. The air blow pipe has a top functioning as an outlet for spouting wind. At the outer circumference of the air blow pipe, an outlet pipe having a larger diameter than that of the air blow pipe is attached so as to surround the air blow pipe from the slightly upstream (adjacent to the main body) site of the outlet toward the downstream side. The outlet pipe extends up to the downstream side of the outlet. A gap in the radial direction is provided between the outlet pipe and the air blow pipe. The outlet pipe has an end opened at the upstream side, the open end functioning as an inlet enabling communication between the inside and outside of the outlet pipe. In the air blower, wind spouting from the outlet generates suction force around the inlet of the outlet pipe, and the suction force sucks air from the inlet to merge the sucked air into the spouting wind, thereby increasing the amount of sent wind.

SUMMARY OF THE INVENTION

A portable air blower used for an operation is sometimes selected from several air blowers having different characteristics depending on the type of the operation. Although the air blower described in Japanese Unexamined Utility Model Registration Application Publication No. 63-56720 may be suitable for an operation requiring a wind quantity, it may be unsuitable for an operation requiring a wind speed. In such a case, another air blower suitable for such an operation requiring a wind speed needs to be prepared, which increases the cost.

In this technical field, a single portable air blower is awaited that can be readily used for operations requiring a wind quantity and a wind speed.

According to one aspect of the present invention, a portable air blower (1A) sending wind generated in a main body (2) includes: a first pipe (4) having a first outlet opening (42) communicating with the main body (2), the first pipe (4) discharging wind generated in the main body (2) through the first outlet opening (42); and a second pipe (5A) having a larger diameter than that of the first pipe (4), the second pipe (5A) being attached movably in the axial direction to the outer circumference of the first pipe (4) and having a second outlet opening (51) having a larger diameter than that of the first outlet opening (42). In the portable air blower (1A), the second pipe (5A) is moved relative to the first pipe (4) to dispose the second outlet opening (51) upstream or downstream of the first outlet opening (42); the second pipe (5A) has an inflow window (56) disposed upstream of the first outlet opening (42), the inflow window (56) enabling air to flow from the outside into the second pipe (5A); wind generated in the main body (2) is sent from the first outlet opening (42) in the case where the second outlet opening (51) is disposed upstream of the first outlet opening (42); and wind generated in the main body (2) is sent through the first outlet opening (42) from the second outlet opening (51) while wind flowing from the inflow window (56) into the second pipe (5A) due to negative pressure is sent from the second outlet opening (51) in the case where the second outlet opening (51) is disposed downstream of the first outlet opening (42).

In the portable air blower (1A) according to the aspect of the present invention, the second pipe (5A) having the second outlet opening (51) is attached movably in the axial direction to the outer circumference of the first pipe (4) having the first outlet opening (42). The second pipe (5A) can be moved relative to the first pipe (4) to dispose the second outlet opening (51) upstream or downstream of the first outlet opening (42). The second pipe (5A) has an inflow window (56) disposed upstream of the first outlet opening (42), the inflow window (56) enabling air to flow from the outside into the second pipe (5A). In the case where the second outlet opening (51) is disposed upstream of the first outlet opening (42), wind generated in the main body (2) is sent from the first outlet opening (42) directly. This can maintain the momentum of wind generated in the main body (2) to send wind suitable for an operation requiring a wind speed. On the other hand, in the case where the second outlet opening (51) is disposed downstream of the first outlet opening (42), wind generated in the main body (2) is sent through the first outlet opening (42) from the second outlet opening (51) while wind flowing from the inflow windows (56) into the second pipe (5A) due to negative pressure is sent from the second outlet opening (51). This can provide wind flowing from the inflow windows (56) in addition to wind generated in the main body (2) for an operation and can be suitable for an operation requiring a wind quantity. As a result, only by moving the second pipe (5A) relative to the first pipe (4), the single portable air blower can be readily used for operations requiring a wind quantity and a wind speed.

The single portable air blower according to the aspect of the present invention can be readily used for operations requiring a wind quantity and a wind speed.

DESCRIPTION OF THE PREFERRED EMBODIMENTS

Figure 1:
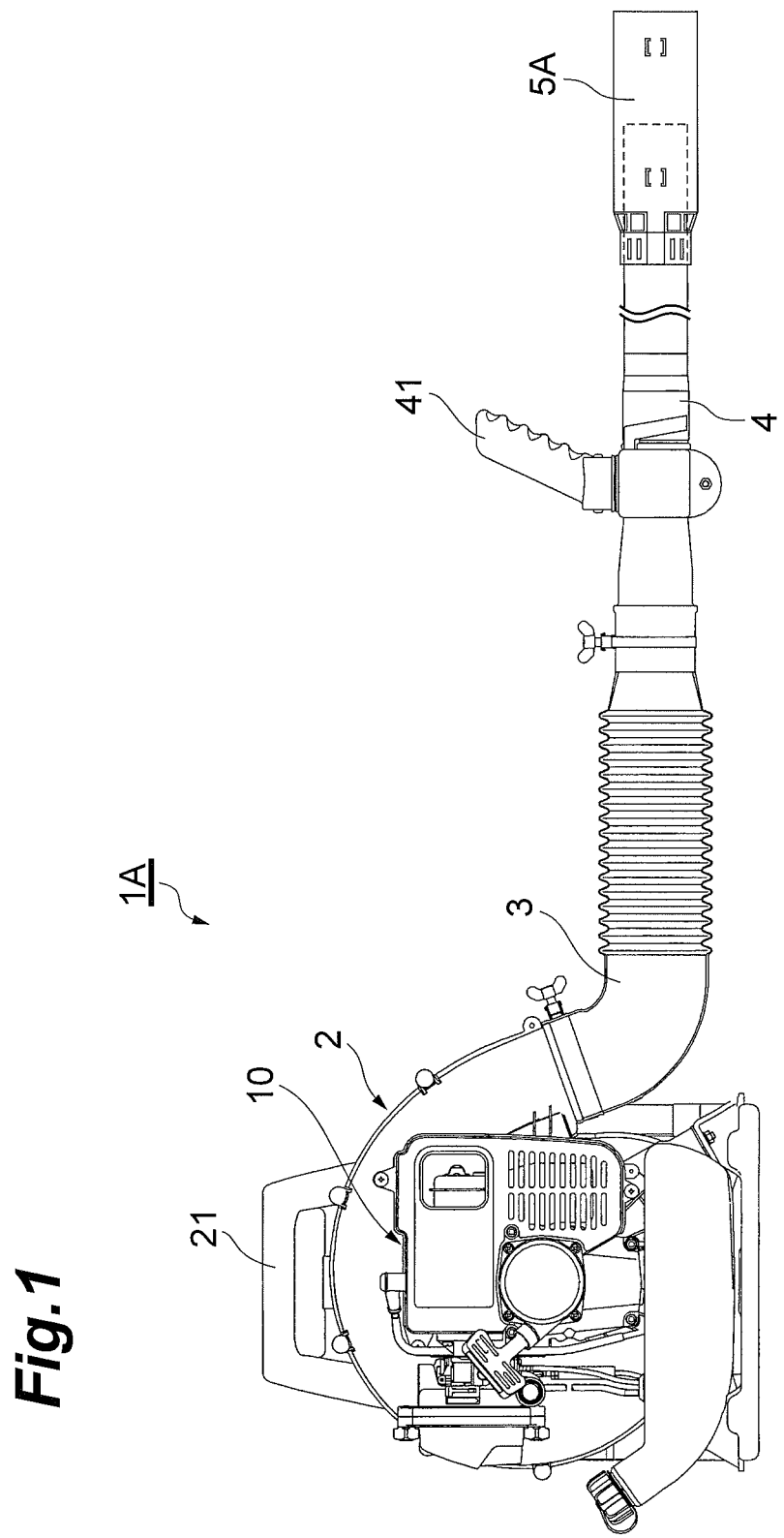
FIG. 1 is a side view illustrating a portable air blower according to a first embodiment.

Embodiments of a portable air blower will be described below in detail with reference to the accompanying drawings. Herein, terms "upper" and "lower" correspond to the vertical direction in the drawings for convenience.

First Embodiment

FIG. 1 is a side view illustrating a portable air blower according to a first embodiment. As illustrated in FIG. 1, a portable air blower 1A, which is carriageable, includes a main body 2, a connection pipe 3, a main pipe (first pipe) 4, and an adjustment pipe (second pipe) 5A.

The main body 2 includes a motor 10 for generating wind. A grip 21 for carrying the main body 2 is provided at the upper part of the main body 2. The main body 2 is also provided with a shoulder strap (not illustrated) used by an operator carrying the portable air blower 1A.

The connection pipe 3 sends wind generated in the main body 2 to the main pipe 4 and joins the main body 2 to the main pipe 4. The connection pipe 3 has a bellows at its substantial center. This can readily move the main pipe 4 relative to the main body 2.

Wind generated in the main body 2 blows from the substantially cylindrical main pipe 4, which is joined to the main body 2 through the connection pipe 3 as described above. A grip 41 for holding the main pipe 4 for an operation is provided at the substantial center of the main pipe 4.

The substantially cylindrical adjustment pipe 5A adjusts wind blowing from the main pipe 4 (described below in detail) and has a larger diameter than that of the main pipe 4. The adjustment pipe 5A is attached to the outer end of the main pipe 4 coaxially with the main pipe 4. The adjustment pipe 5A can move relative to the main pipe 4 in the axial direction of the main pipe 4 (described below in detail).

Figure 2:
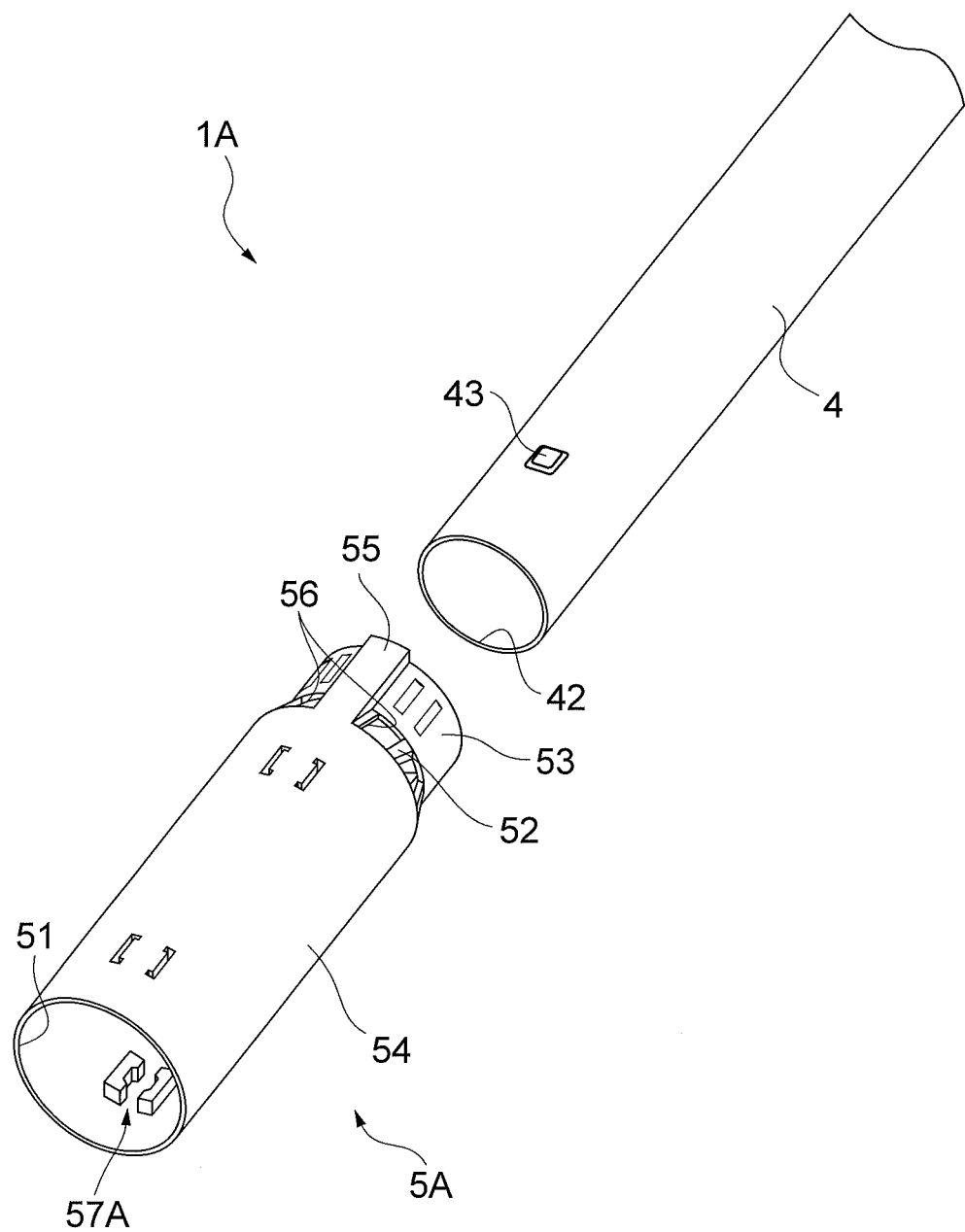
FIG. 2 is an exploded perspective top view illustrating a first pipe and a second pipe of the portable air blower illustrated in FIG. 1.
Figure 3:
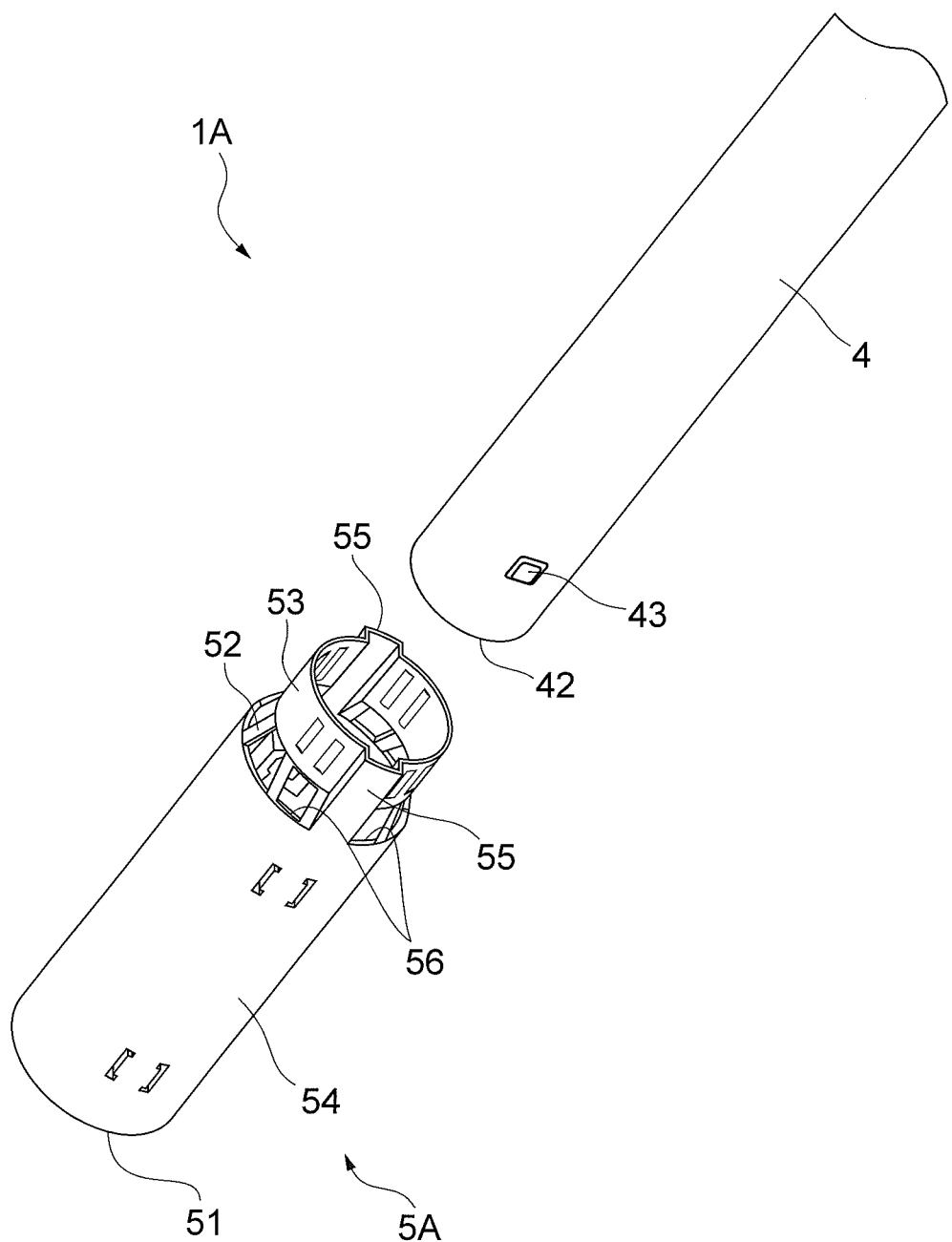
FIG. 3 is an exploded perspective bottom view illustrating the first and second pipes of the portable air blower illustrated in FIG. 1.
Figure 4:
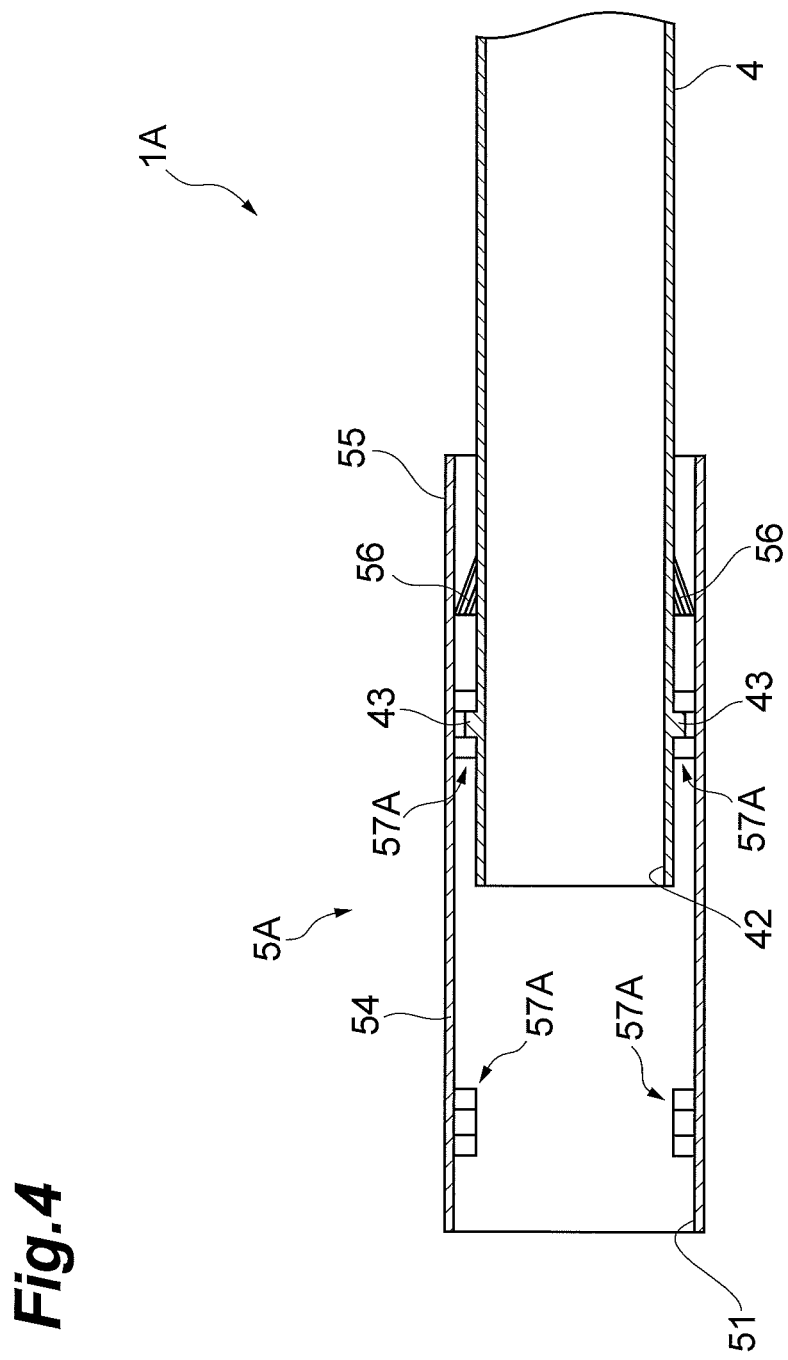
FIG. 4 is a cross-sectional view illustrating the relative positions of a first outlet opening and a second outlet opening in the case where the portable air blower illustrated in FIG. 1 is used for an operation requiring a wind quantity.
Figure 5:
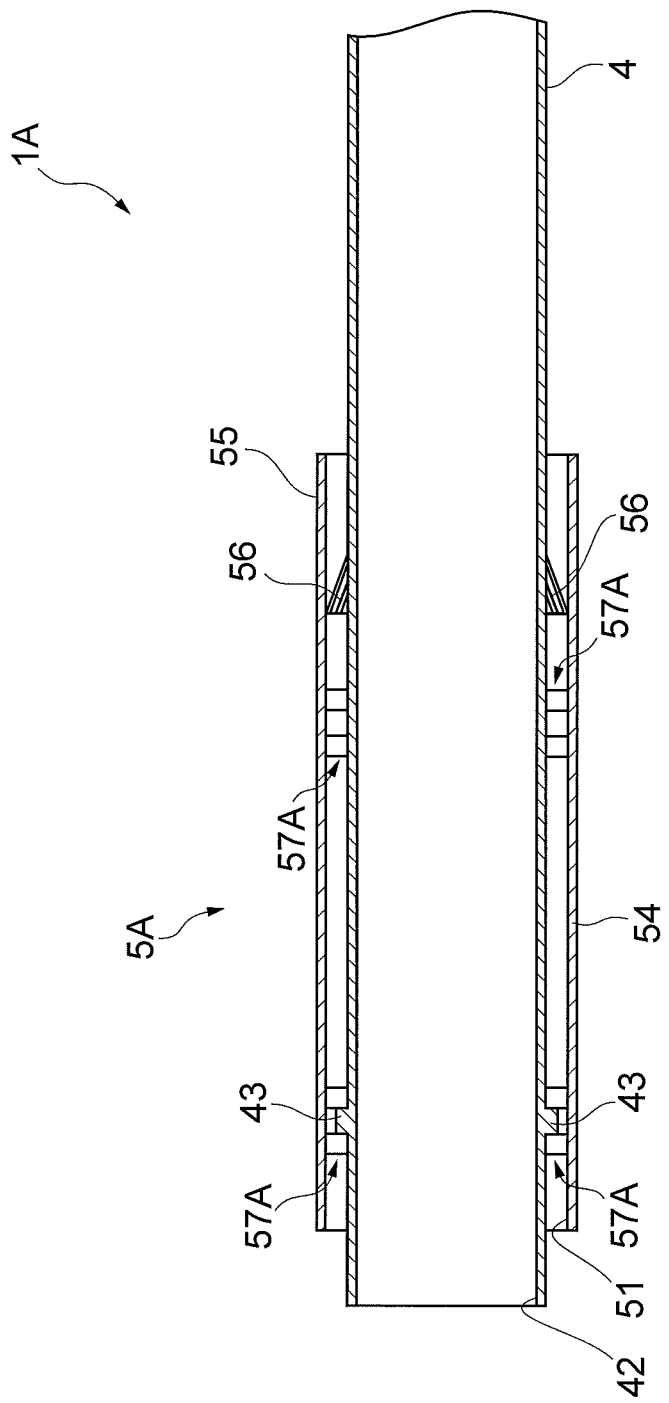
FIG. 5 is a cross-sectional view illustrating the relative positions of the first and second outlet openings in the case where the portable air blower illustrated in FIG. 1 is used for an operation requiring a wind speed.

The main pipe 4 and the adjustment pipe 5A will be described below in detail. FIG. 2 is an exploded perspective top view illustrating the first and second pipes of the portable air blower illustrated in FIG. 1. FIG. 3 is an exploded perspective bottom view illustrating the first and second pipes of the portable air blower illustrated in FIG. 1. FIG. 4 is a cross-sectional view illustrating the relative positions of a first outlet opening and a second outlet opening in the case where the portable air blower illustrated in FIG. 1 is used for an operation requiring a wind quantity. FIG. 5 is a cross-sectional view illustrating the relative positions of the first and second outlet openings in the case where the portable air blower illustrated in FIG. 1 is used for an operation requiring a wind speed.

As illustrated in FIGS. 2 and 3, the first outlet opening 42 is opened at the downstream end (lower side in FIG. 2) of the main pipe 4. Wind sent from the main body 2 through the connection pipe 3 to the main pipe 4 blows from the first outlet opening 42. On the outer circumference of the main pipe 4, engagement protrusions 43 and 43 are separated from each other by 180 degrees in the circumferential direction slightly upstream of the first outlet opening 42. The engagement protrusions 43 protrude outward from the outer circumference of the main pipe 4 in the radial direction and have substantially rectangular cross sections.

The second outlet opening 51 is opened at the downstream end of the adjustment pipe 5A. At a slightly downstream site from the upstream end of the adjustment pipe 5A, a taper 52 inclines in the axial direction so as to have smaller inner and outer diameters from the downstream side toward the upstream side. The adjustment pipe 5A has a small-diameter portion 53 upstream of the taper 52 and a large-diameter portion 54 downstream of the taper 52. The small-diameter portion 53 has a slightly larger inner diameter than the outer diameter of the main pipe 4 to enable the main pipe 4 to be inserted into the inside of the small-diameter portion 53.

As illustrated in FIG. 3, guides 55 having a constant inner diameter and a constant outer diameter extend in the axial direction from the large-diameter portion 54 toward the upstream end of the small-diameter portion 53 (the upstream end of the adjustment pipe 5A) over the taper 52 and the small-diameter portion 53, the guides 55 being separated from each other by 180 degrees in the circumferential direction. The guides 55 have substantially U-shaped grooves having slightly larger widths than those of the engagement protrusions 43 of the main pipe 4, at the inside of the guides 55. The grooves function as guides enabling the engagement protrusions 43 to be inserted in the axial direction. Multiple inflow windows 56 opened in the taper 52 in the circumferential direction of the adjustment pipe 5A enable communication between the inside and outside of the adjustment pipe 5A.

As illustrated in FIG. 2, engagement fixation portions 57A and 57A are separated from each other by 180 degrees at the substantially same positions as those of the guides 55 (the positions on the extended lines in the axial direction), in the circumferential direction at the downstream part (the upstream part adjacent to the second outlet opening 51) of the inner circumference of the large-diameter portion 54 (see FIG. 4). Similarly, engagement fixation portions 57A and 57A are separated from each other by 180 degrees at the substantially same positions as those of the guides 55 (the positions on the extended lines in the axial direction), in the circumferential direction at the upstream part (the downstream part adjacent to the taper 52) of the inner circumference of the large-diameter portion 54 (see FIG. 4). The engagement fixation portion 57A is composed of two substantially U-shaped protrusions protruding inward from the inner circumference of the large-diameter portion 54 in the radial direction. The protrusions are separated from each other such that their internal portions face each other in the circumferential direction. The distance between the two protrusions of the engagement fixation portion 57A is determined so as to enable the engagement protrusion 43 to be fit between the internal portions. This can fix the adjustment pipe 5A to the main pipe 4. In contrast, when the engagement protrusions 43 are not fixed to the engagement fixation portions 57A, the adjustment pipe 5A can move relative to the main pipe 4 in the axial direction of the main pipe 4.

When the engagement protrusions 43 and 43 are fixed to the engagement fixation portions 57A and 57A at the upstream side as illustrated in FIG. 4, the adjustment pipe 5A proceeds to the downstream side beyond the first outlet opening 42 of the main pipe 4 to dispose the second outlet opening 51 of the adjustment pipe 5A downstream of the first outlet opening 42 of the main pipe 4. In contrast, when the engagement protrusions 43 and 43 are fixed to the engagement fixation portions 57A and 57A at the downstream side as illustrated in FIG. 5, the adjustment pipe 5A recedes from the first outlet opening 42 of the main pipe 4 to the upstream side to dispose the second outlet opening 51 of the adjustment pipe 5A upstream of the first outlet opening 42 of the main pipe 4. As described above, the adjustment pipe 5A is moved relative to the main pipe 4 in the axial direction to fix the engagement protrusions 43 and 43 of the main pipe 4 to the engagement fixation portions 57A and 57A upstream or downstream of the adjustment pipe 5A. This can dispose the second outlet opening 51 of the adjustment pipe 5A upstream or downstream of the first outlet opening 42 of the main pipe 4. The inflow windows 56 are always disposed upstream of the first outlet opening 42.

The operation of the portable air blower according to the present embodiment will be described below.

In the portable air blower 1A, the motor 10 in the main body 2 is driven to generate wind blowing from the first outlet opening 42 of the main pipe 4. An operator holds the grip 41 of the main pipe 4 to operate the main pipe 4 and uses wind blowing from the first outlet opening 42 for an operation.

At this time, when the engagement protrusions 43 and 43 of the main pipe 4 are fixed to the engagement fixation portions 57A and 57A upstream of the adjustment pipe 5A as illustrated in FIG. 4, the second outlet opening 51 of the adjustment pipe 5A is disposed downstream of the first outlet opening 42 of the main pipe 4 as described above. Wind blowing from the first outlet opening 42 is therefore sent through the inside of the adjustment pipe 5A from the second outlet opening 51 of the adjustment pipe 5A to the outside.

At this time, when wind blowing from the first outlet opening 42 passes through the inside of the adjustment pipe 5A, negative pressure is generated around the inflow windows 56 upstream of the first outlet opening 42. The negative pressure generates air flow from the outside toward the inside of the adjustment pipe 5A at the inflow windows 56. Wind generated by air flowing from the inflow windows 56 to the adjustment pipe 5A is sent from the second outlet opening 51 to the outside together with wind blowing from the first outlet opening 42. This can increase a wind quantity by, for example, 20% or above in the portable air blower 1A. A wind quantity used for an operation can be increased as described above.

In contrast, when the fixed engagement protrusions 43 and 43 of the main pipe 4 are released from the engagement fixation portions 57A and 57A at the upstream side to move the adjustment pipe 5A in the axial direction and are fixed to the engagement fixation portions 57A and 57A at the downstream side as illustrated in FIG. 5, the second outlet opening 51 of the adjustment pipe 5A is disposed upstream of the first outlet opening 42 of the main pipe 4 as described above. Wind blowing from the first outlet opening 42 is therefore sent to the outside directly. This maintains the momentum of wind generated in the main body 2.

As described above, in the portable air blower 1A of the present embodiment, the adjustment pipe 5A having the second outlet opening 51 is attached movably in the axial direction of the main pipe 4, at the outer circumference of the main pipe 4 having the first outlet opening 42. The adjustment pipe 5A can be moved relative to the main pipe 4 to dispose the second outlet opening 51 upstream or downstream of the first outlet opening 42. Upstream of the first outlet opening 42, the adjustment pipe 5A has the inflow windows 56 enabling air to flow from the outside into the adjustment pipe 5A. When the second outlet opening 51 is disposed upstream of the first outlet opening 42, wind generated in the main body 2 is sent from the first outlet opening 42 directly. This can maintain the momentum of wind generated in the main body 2 to send wind suitable for an operation requiring a wind speed. In contrast, when the second outlet opening 51 is disposed downstream of the first outlet opening 42, wind generated in the main body 2 is sent through the first outlet opening 42 from the second outlet opening 51 while wind flowing from the inflow windows 56 into the adjustment pipe 5A due to negative pressure is sent from the second outlet opening 51. This can provide wind flow from the inflow windows 56 in addition to wind generated in the main body 2 for an operation and can be suitable for an operation requiring a wind quantity. As a result, only by moving the adjustment pipe 5A relative to the main pipe 4, the single portable air blower can be readily used for operations requiring a wind quantity and a wind speed. Additionally, the portable air blower can be suitable for the type of an operation only by attaching the adjustment pipe 5A to the end of the main pipe 4. This can reduce the cost in comparison with adjustment of a wind quantity and a wind speed by changing the design of the motor 10 in the main body 2.

Second Embodiment

Figure 6:
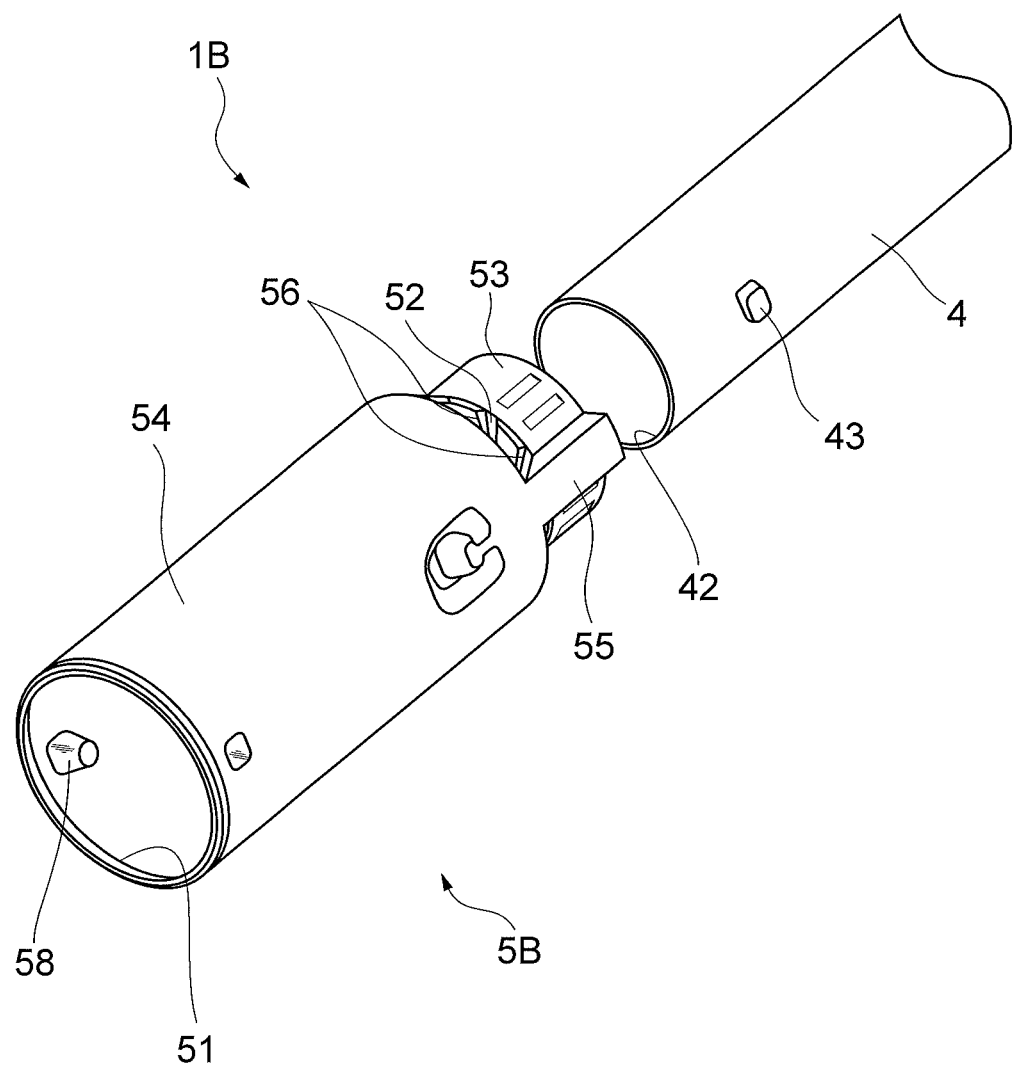
FIG. 6 is an exploded perspective top view illustrating a first pipe and a second pipe of a portable air blower according to a second embodiment.
Figure 7:
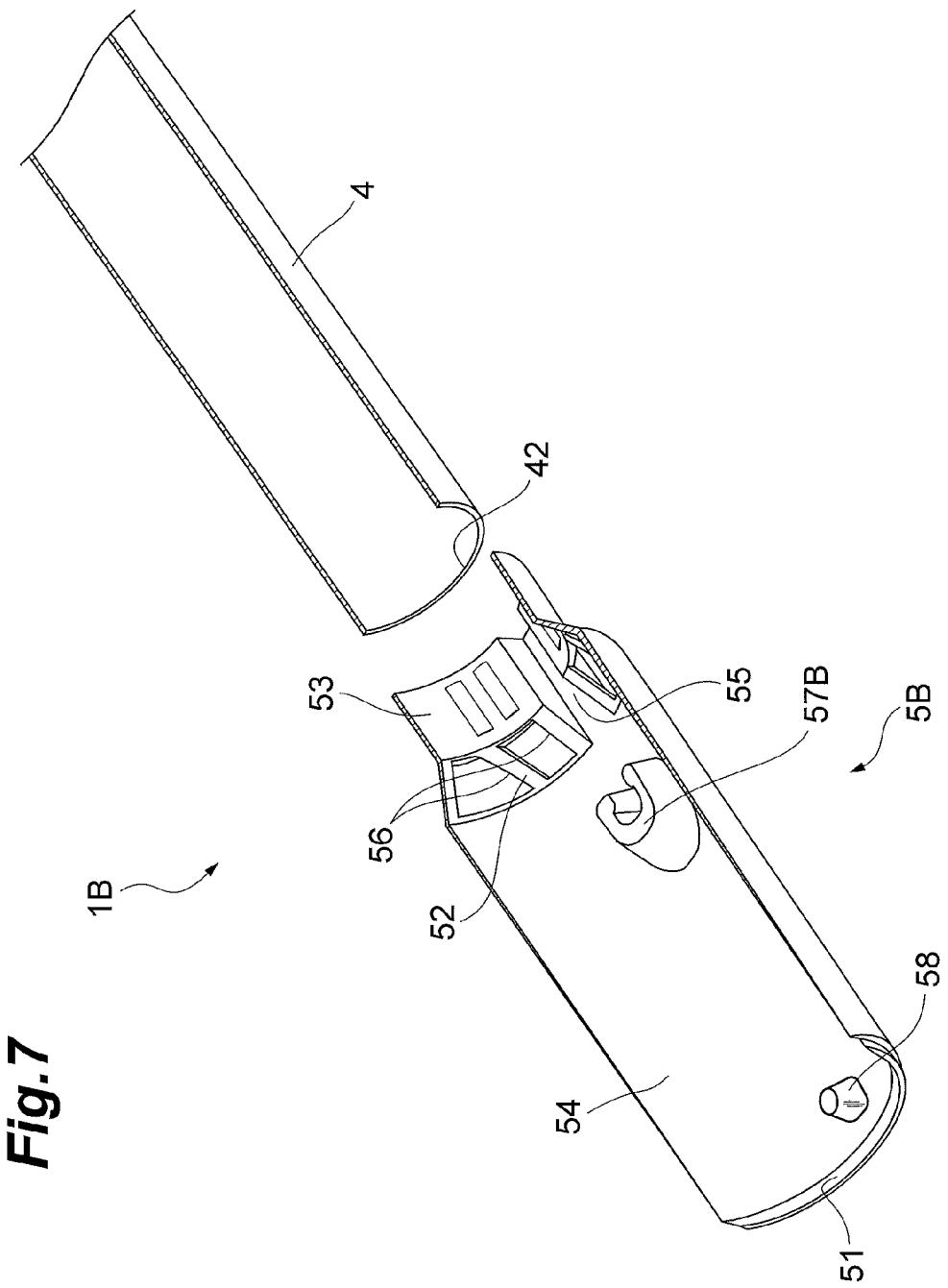
FIG. 7 is an exploded cutaway perspective view illustrating the insides of the first and second pipes illustrated in FIG. 6.
Figure 8:
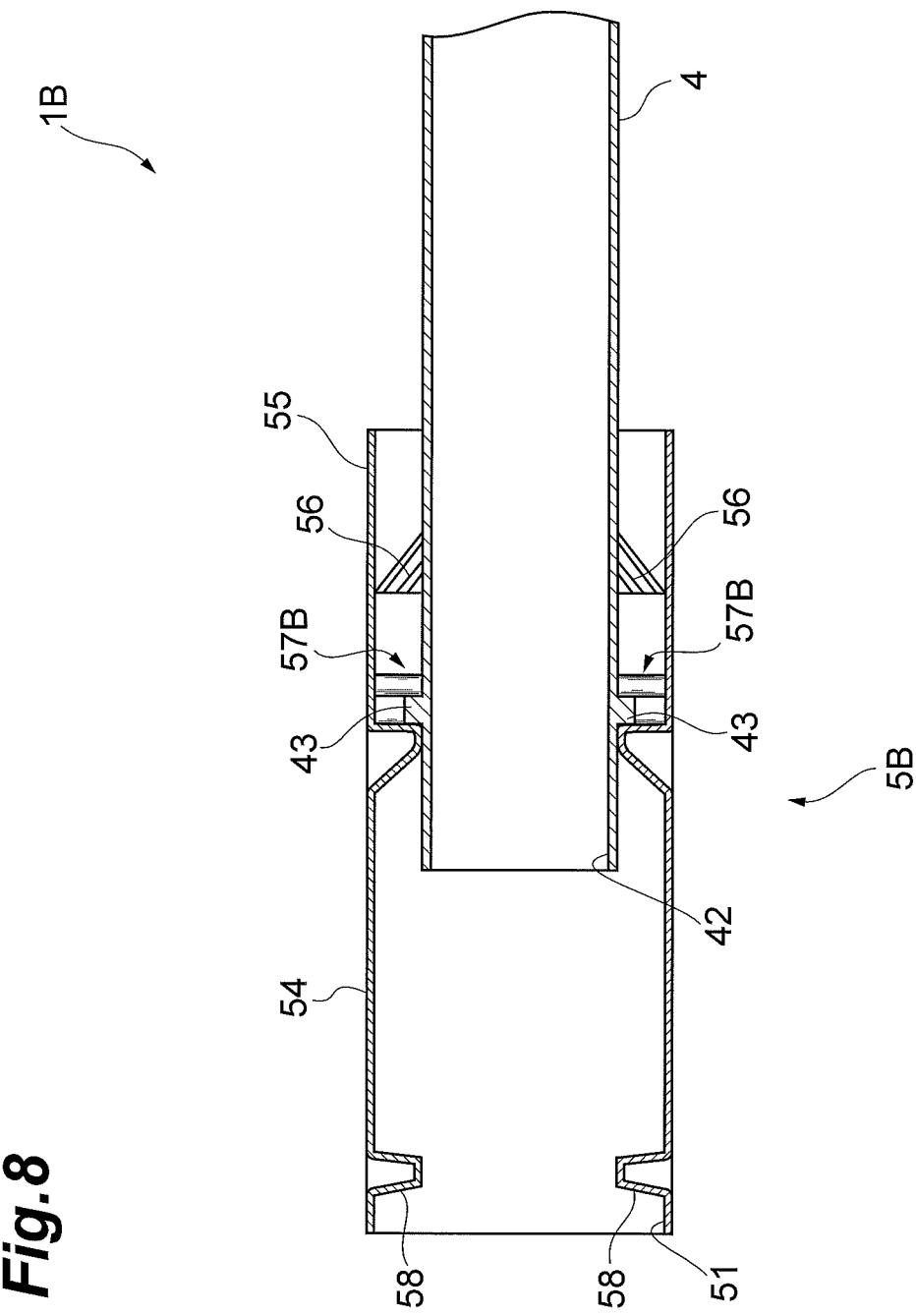
FIG. 8 is a cross-sectional view illustrating the relative positions of a first outlet opening and a second outlet opening in the case where the first and second pipes illustrated in FIG. 6 are used for an operation requiring a wind quantity.
Figure 9:
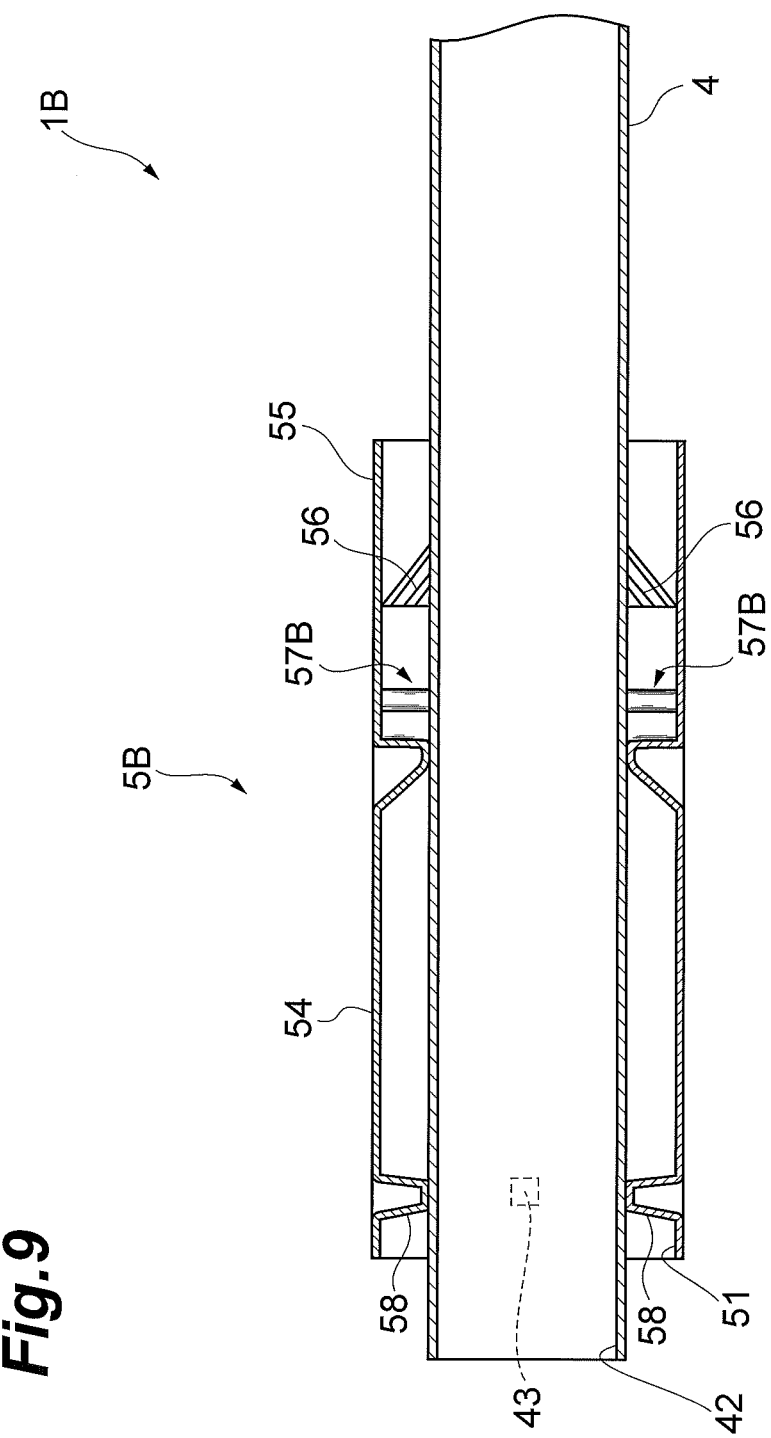
FIG. 9 is a cross-sectional view illustrating the relative positions of the first and second outlet openings in the case where the first and second pipes illustrated in FIG. 6 are used for an operation requiring a wind speed.

FIG. 6 is an exploded perspective top view illustrating a first pipe and a second pipe of a portable air blower according to a second embodiment. FIG. 7 is an exploded cutaway perspective view illustrating the insides of the first and second pipes illustrated in FIG. 6. FIG. 8 is a cross-sectional view illustrating the relative positions of a first outlet opening and a second outlet opening in the case where the first and second pipes illustrated in FIG. 6 are used for an operation requiring a wind quantity. FIG. 9 is a cross-sectional view illustrating the relative positions of the first and second outlet openings in the case where the first and second pipes illustrated in FIG. 6 are used for an operation requiring a wind speed.

As illustrated in FIGS. 6 to 9, a portable air blower 1B according to the present embodiment is different from the portable air blower 1A (see FIGS. 2 and 3) according to the first embodiment mainly in that an adjustment pipe 5B having a modified structure for fixation to a main pipe 4 is used instead of the adjustment pipe 5A.

Specifically, as illustrated in FIGS. 6 to 9, in the adjustment pipe 5B of the portable air blower 1B, protrudent supporters 58 and 58 are separated from each other by 180 degrees at the substantially same positions as those of the guides 55 (the positions on the extended lines in the axial direction), in the circumferential direction at the downstream part (the upstream part adjacent to the second outlet opening 51) of the inner circumference of the large-diameter portion 54. The protrudent supporters 58 protrude inward from the inner circumference of the adjustment pipe 5B in the radial direction. The distance in the radial direction between the facing protrudent supporters 58 and 58 is slightly shorter than the outer diameter of the main pipe 4. As illustrated in FIG. 9, the main pipe 4 can thereby be held between the facing protrudent supporters 58 and 58. Additionally, the adjustment pipe 5B fixed to the main pipe 4 recedes to the upstream side from the first outlet opening 42 of the main pipe 4 to dispose the second outlet opening 51 of the adjustment pipe 5B upstream of the first outlet opening 42 of the main pipe 4.

As illustrated in FIGS. 6 to 9, engagement fixation portions 57B and 57B are separated from each other by 180 degrees at the substantially same positions as those of the guides 55 (the positions on the extended lines in the axial direction), in the circumferential direction at the upstream part (the downstream part adjacent to the taper 52) of the inner circumference of the large-diameter portion 54. As illustrated in FIG. 7, the substantially horseshoe-shaped engagement fixation portions 57B protrude inward from the inner circumference of the adjustment pipe 5B in the radial direction and are opened toward the upstream side. The size of the central space of the engagement fixation portion 57B is determined so as to enable the engagement protrusion 43 to be fit to the central space. This enables the engagement protrusion 43 to be fit into the engagement fixation portion 57B through the opened portion from only the upstream side. As illustrated in FIG. 8, the engagement protrusions 43 are fit into the engagement fixation portions 57B to fix the adjustment pipe 5B to the main pipe 4 while the adjustment pipe 5B proceeds to the downstream side beyond the first outlet opening 42 of the main pipe 4 to dispose the second outlet opening 51 of the adjustment pipe 5B downstream of the first outlet opening 42 of the main pipe 4.

Figure 10:
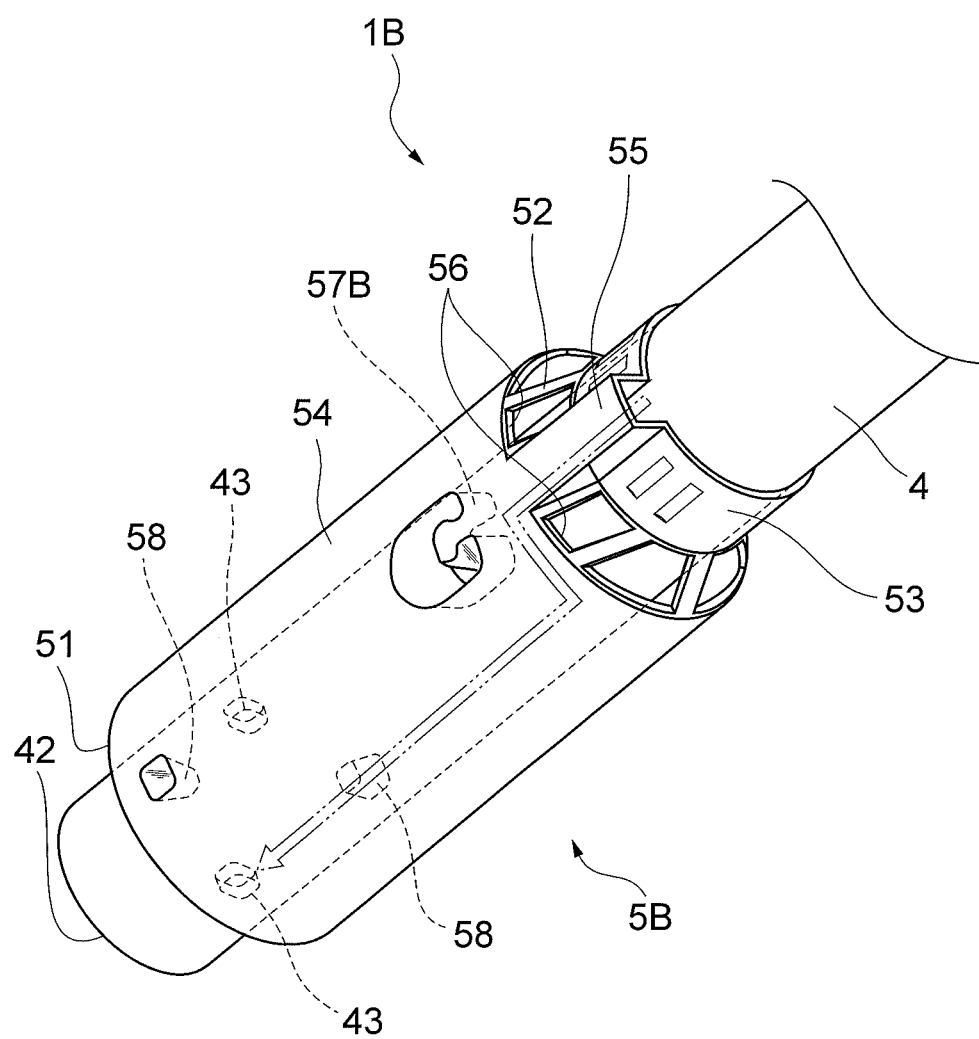
FIG. 10 is a perspective view illustrating a way for moving the second pipe illustrated in FIG. 6.

FIG. 10 is a perspective view illustrating a way for moving the second pipe illustrated in FIG. 6. As illustrated in FIG. 10, to dispose the second outlet opening 51 of the adjustment pipe 5B upstream of the first outlet opening 42 of the main pipe 4 in the portable air blower 1B, the adjustment pipe 5B is attached to the outside of the main pipe 4 so as to guide the engagement protrusions 43 of the main pipe 4 along the guides 55 of the adjustment pipe 5B. Next, the engagement protrusions 43 are moved to a position between the guides 55 and the engagement fixation portions 57B to then rotate the adjustment pipe 5B relative to the main pipe 4 so as not to align the engagement protrusions 43 of the main pipe 4 with the engagement fixation portions 57B of the adjustment pipe 5B in the axial direction (so as to dispose the elements at different positions in the circumferential direction). The adjustment pipe 5B is then moved to an upstream site in the axial direction of the main pipe 4 to hold the main pipe 4 between the protrudent supporters 58 and 58 of the adjustment pipe 5B. The second outlet opening 51 of the adjustment pipe 5B can thereby be disposed upstream of the first outlet opening 42 of the main pipe 4.

Following this, to dispose the second outlet opening 51 of the adjustment pipe 5B downstream of the first outlet opening 42 of the main pipe 4, the adjustment pipe 5B is moved to a downstream site in the axial direction to release the main pipe 4 held between the protrudent supporters 58 and 58. The engagement protrusions 43 are then moved to a position between the guides 55 and the engagement fixation portions 57B in the axial direction to then rotate the adjustment pipe 5B relative to the main pipe 4 so as to align the engagement protrusions 43 of the main pipe 4 with the engagement fixation portions 57B of the adjustment pipe 5B (so as to dispose the elements at the same position in the circumferential direction). The adjustment pipe 5B is then moved to an upstream site in the axial direction of the main pipe 4 to fit the engagement protrusions 43 and 43 of the main pipe 4 into the engagement fixation portions 57B and 57B of the adjustment pipe 5B. The second outlet opening 51 of the adjustment pipe 5B can thereby be disposed downstream of the first outlet opening 42 of the main pipe 4.

The portable air blower 1B obviously provides similar advantageous effects to the portable air blower 1A according to the first embodiment.

The portable air blowers according to the embodiments have been described above. The present invention is however not limited to the embodiments. For example, the structure for fixing the adjustment pipe 5A or 5B to the main pipe 4 is not limited to the embodiments. In other words, any structure can be used that enables the second outlet opening 51 of the adjustment pipe 5A or 5B to be disposed upstream or downstream of the first outlet opening 42 of the main pipe 4.

The main pipe 4 and the adjustment pipes 5A and 5B in the embodiments are substantially cylindrical pipes, but may be polygonal pipes.

What is claimed is:

1. A portable air blower sending wind generated in a main body, comprising:
    a first pipe having a first outlet opening communicating with the main body, the first pipe discharging wind generated in the main body through the first outlet opening; and
    a second pipe having a larger diameter than that of the first pipe, the second pipe being attached movably in the axial direction to the outer circumference of the first pipe and having a second outlet opening having a larger diameter than that of the first outlet opening, wherein
    the second pipe is moved relative to the first pipe to dispose the second outlet opening upstream or downstream of the first outlet opening;
    the second pipe has an inflow window disposed upstream of the first outlet opening, the inflow window enabling air to flow from the outside into the second pipe;
    wind generated in the main body is sent from the first outlet opening in the case where the second outlet opening is disposed upstream of the first outlet opening; and
    wind generated in the main body is sent through the first outlet opening from the second outlet opening while wind flowing from the inflow window into the second pipe due to negative pressure is sent from the second outlet opening in the case where the second outlet opening is disposed downstream of the first outlet opening.

2. The portable air blower according to claim 1,
    wherein the second pipe has a taper, a small-diameter portion disposed upstream of the taper, and a large-diameter portion disposed downstream of the taper,
    the small-diameter portion has a larger inner diameter than the outer diameter of the first pipe,
    the large-diameter portion has a larger inner diameter than the outer diameter of the small-diameter portion, and
    the taper inclines in the axial direction so as to have smaller inner and outer diameters from the downstream side toward the upstream side.

3. The portable air blower according to claim 2,
    wherein the second pipe has a plurality of inflow windows disposed upstream of the first outlet opening enabling air to flow from the outside into the second pipe, the plurality of inflow windows are opened in the taper in the circumferential direction of the second pipe.

4. The portable air blower according to claim 3,
    wherein an engagement protrusion is disposed the outer circumference of the first pipe,
    a guide enabling the engagement protrusion to be inserted in the axial direction is disposed over the taper and the small-diameter portion, and,
    an engagement fixation portion enabling the engagement protrusion to be fixed is disposed the inner circumference of the large-diameter portion.

* * * * *